US005549441A

United States Patent [19]

Reinke

[11] Patent Number: 5,549,441

[45] Date of Patent: Aug. 27, 1996

[54] APPARATUS FOR MOVING OBJECTS FROM LOCATION AND PLACING THEM IN ANOTHER

[75] Inventor: Stephen M. Reinke, Rochester, N.Y.

[73] Assignee: Eastman Kodak Company, Rochester, N.Y.

[21] Appl. No.: 405,315

[22] Filed: Mar. 16, 1995

[51] Int. Cl.[6] .......... B25J 18/04

[52] U.S. Cl. .......... 414/744.6; 74/55

[58] Field of Search .......... 414/744.1, 744.2, 414/744.6; 74/55, 490.01, 490.03, 490.04; 198/468.4, 468.6; 901/21, 23, 19

[56] References Cited

U.S. PATENT DOCUMENTS

| | | | |
|---|---|---|---|
| 2,700,534 | 1/1955 | Pegues | 74/55 X |
| 2,940,232 | 6/1960 | Wallace et al. | 53/112 |
| 3,364,552 | 1/1968 | Napor et al. | 29/208 |
| 4,076,135 | 2/1978 | Klose | 214/300 |
| 5,044,144 | 9/1991 | Foote, Jr.; et al. | 53/456 |
| 5,319,407 | 6/1994 | DiRisio | 354/275 |
| 5,347,334 | 9/1994 | Smart et al. | 354/275 |
| 5,357,303 | 10/1994 | Writ | 354/275 |

FOREIGN PATENT DOCUMENTS

| | | | |
|---|---|---|---|
| 0582852 A1 | 2/1994 | European Pat. Off. . | |
| 1407787 | 7/1988 | U.S.S.R. | 414/744.6 |

*Primary Examiner*—Donald W. Underwood
*Attorney, Agent, or Firm*—Clyde E. Bailey, Sr.

[57] ABSTRACT

Objects (240) are picked up from a conveyor (242) by a pickup head (90, 92), moved radially by a transfer assembly (26–50; 82–92) which then is rotated by an actuator (16) to position the pickup head at a second location where the transfer assembly moves the pickup head radially.

7 Claims, 12 Drawing Sheets

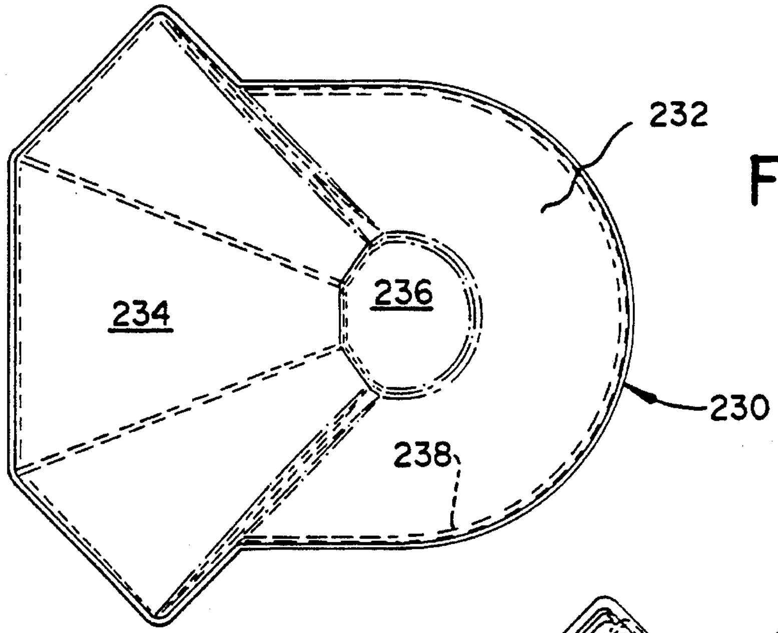
FIG. 18
FIG. 17
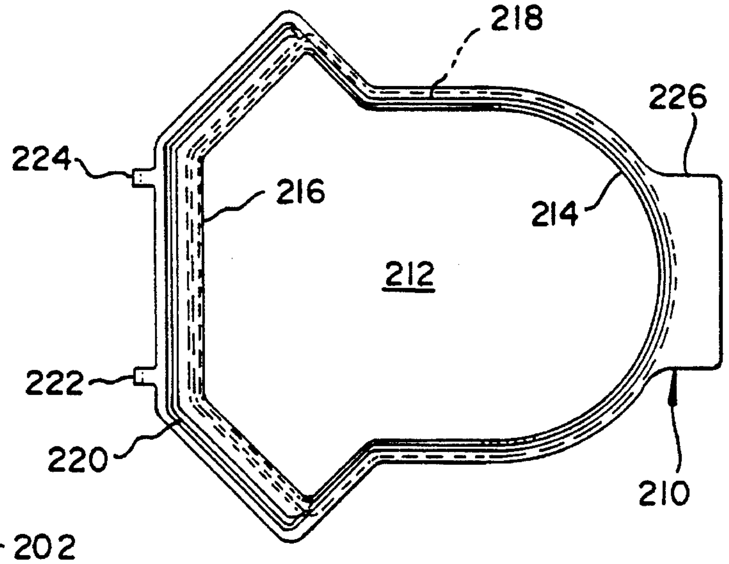
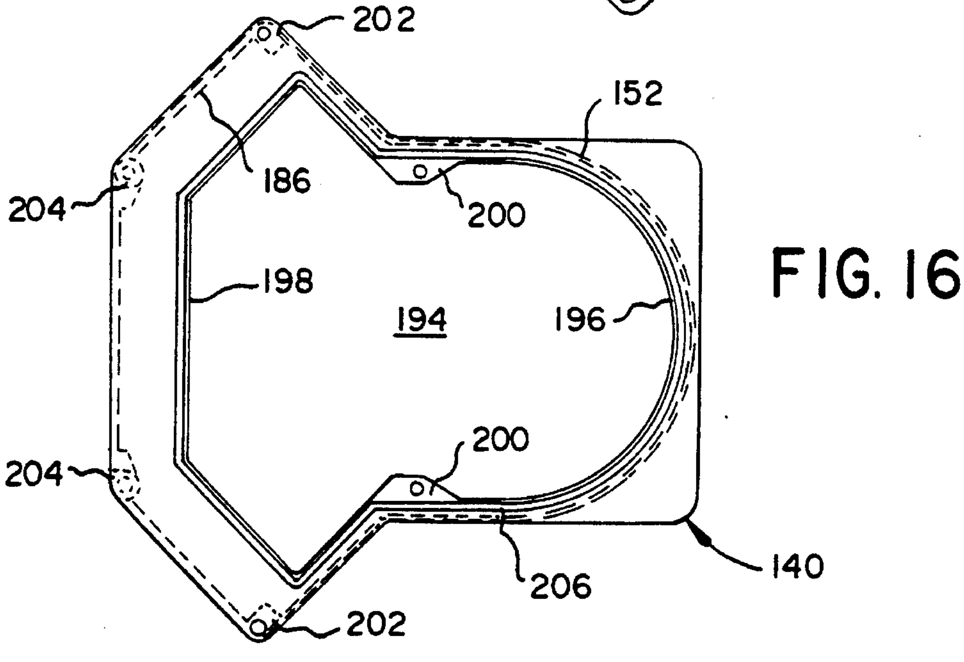
FIG. 16

APPARATUS FOR MOVING OBJECTS FROM LOCATION AND PLACING THEM IN ANOTHER

TECHNICAL FIELD

The invention concerns apparatus for picking objects from one location and placing them in another. More particularly, the invention concerns apparatus for picking cartridges for photographic film from a lighted environment, placing them in a darkened environment, and vice versa.

BACKGROUND ART

In the manufacture of photographic film cartridges, a wound spool or scroll of film has been installed in a cartridge shell, after which the shell has been closed to a light-tight configuration to prevent exposure of the film prior to installation in a customer's camera. Commonly assigned U.S. Pat. Nos. 2,940,232 and 5,044,144 disclose apparatus for assembling such cartridges, each of which operates virtually entirely in a dark room. Other types of cartridges have been assembled by first making a preliminary assembly of the parts of the cartridge shell in a lighted room and then passing the preliminary assembly into a dark room for installation of the film and final closure of the cartridge. U.S. Pat. No. 3,364,552 discloses an apparatus for assembling such cartridges in which the preliminary assembly is moved on a conveyor in the lighted room to a first transfer wheel positioned in a light trap chamber. The first transfer wheel passes the assembly along a serpentine path within the chamber to a second transfer wheel which passes the assembly to a further conveyor in the dark room. Apparatus for transfer of exposed film cartridges from a lighted room to a dark room is shown in U.S. Pat. No. 4,076,135 in which the cartridges are fed by gravity along an enclosed chute from a lighted room to a dark room. Light is excluded from the dark room by a plurality of apertured shutters which control movement of the cartridges along the chute.

While apparatus of the types just described has achieved a considerable level of success, more recent cartridge designs, such as that shown in commonly assigned U.S. Pat. No. 5,319,407 are to be completely assembled, without film, in a lighted room, after which the empty cartridge must be transferred to a dark room where a strip of film can be wound into the cartridge. Thus, a need has developed for an improved apparatus for rapidly and reliably moving such cartridges between lighted and darkened environments.

SUMMARY OF THE INVENTION

A primary objective of the invention is to provide an apparatus for picking an empty cartridge from a lighted room and placing it in a dark room for further processing, such as installation of photographic film.

Another objective is to provide such an apparatus which includes an effective light lock, is very reliable and can be synchronously timed to the operation of an apparatus for installing film into the cartridge.

Still another objective is to provide such an apparatus which is capable of moving the cartridges with well controlled velocities and accelerations and with a high degree of accuracy and repeatability.

Yet another objective is to provide such an apparatus with features for inhibiting its operation during some cycles of operation and for preventing overload of its components in the event of a malfunction.

These objectives are given only by way of illustrative examples; thus other desirable objectives and advantages inherently achieved by my invention may occur or become apparent to those skilled in the art.

My invention is defined by the claims. My apparatus is particularly suited for moving objects from one location to another and may include a frame; and a hollow shaft rotatably supported by the frame. An object transfer assembly may be supported on the hollow shaft for movement between a first position for access to one location and a second position for access to another location. A first actuator is included for rotating the hollow shaft between the first and second positions and an extendible transfer arm is included in the transfer assembly. A pickup head is supported by the extendible transfer arm for grasping an object or releasing an object. A second actuator is included for moving the pickup head back and forth with the extendible transfer arm at each of the first and second positions, the second actuator comprising an actuator rod extended through the hollow shaft, the actuator rod having a driven end and an output end; a cam supported by the frame and operatively connected for synchronous rotation by the first actuator, the cam being engaged with the driven end of the actuator rod; a connector arm pivotably connected at one end to the output end of the actuator rod and pivotably connected at another end to the transfer arm, whereby rotation of the cam causes translational movement of the actuator rod which causes the connector arm to move the transfer arm radially relative to the hollow shaft.

The extendible transfer arm may be supported by a slide; and the second actuator may move the transfer arm radially outward and inward at the first and second positions. The transfer assembly may oscillate between the first and second positions. Means may be included for selectively disengaging the cam from the driven end of the actuator rod, to inhibit radial movement of the transfer arm. This means may include a cam follower supported by the driven end; a cam follower bracket attached to the driven end; and a pneumatic actuator connected between the frame and the follower bracket for selectively disengaging the cam follower from the cam. The connector arm may be collapsible in case of overload applied to the pickup head. Preferably, the cam causes the transfer arm to dwell at the first and second positions.

Numerous advantages are provided by the apparatus of my invention. The apparatus is fully mechanically integrated to provide highly reliable means for moving film cartridges from a lighted room into and out of a darkened enclosure. This enables operation of associated apparatus and activities of human operators to be performed in the lighted room. The cartridges can be picked and placed with great accuracy. High operating speeds with controlled accelerations can be achieved. Operation of the apparatus readily can be inhibited in case of a malfunction. Overload protection is provided. A single shaft can be used to drive synchronously all the components of the apparatus.

BRIEF DESCRIPTION OF THE DRAWINGS

The foregoing and other objectives, features and advantages of the invention will be apparent from the following more particular description of the invention, as illustrated in the accompanying drawings.

FIG. 16 shows a plan view of the front frame plate of the light-lock enclosure.

FIG. 17 shows a plan view of the cover frame of the light-lock enclosure.

FIG. 18 shows a plan view of the domed cover of the light-lock enclosure.

DESCRIPTION OF THE PREFERRED EMBODIMENTS

Figure 1:
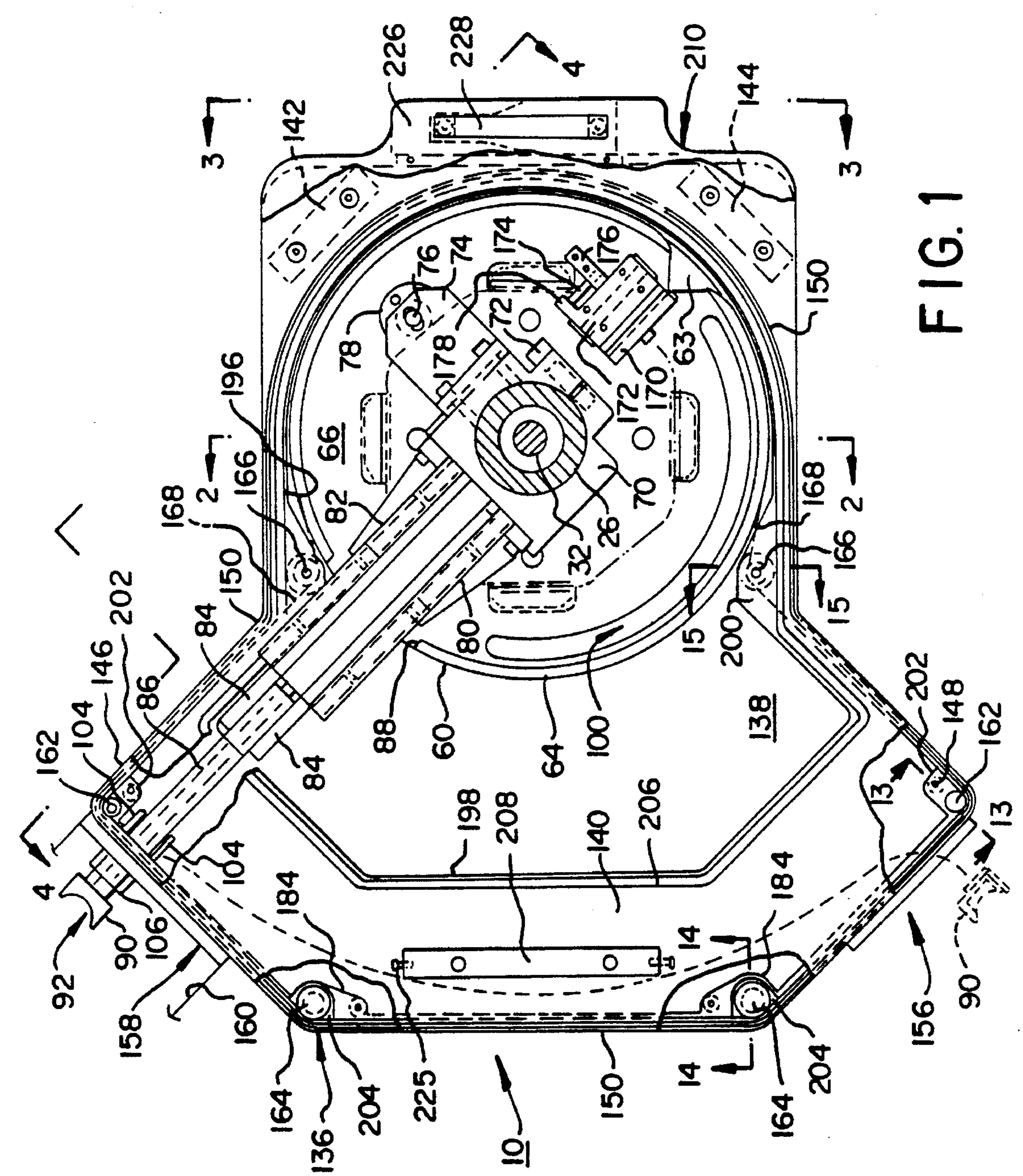
FIG. 1 shows an front elevation view, partially broken away and taken along line 1—1 of FIG. 2, of the apparatus of the invention, with the collapsible connector arm shown only fragmentarily.

The following is a detailed description of my invention, reference being made to the drawings in which the same reference numerals identify the same elements of structure in each of the several Figures.

Figure 2:
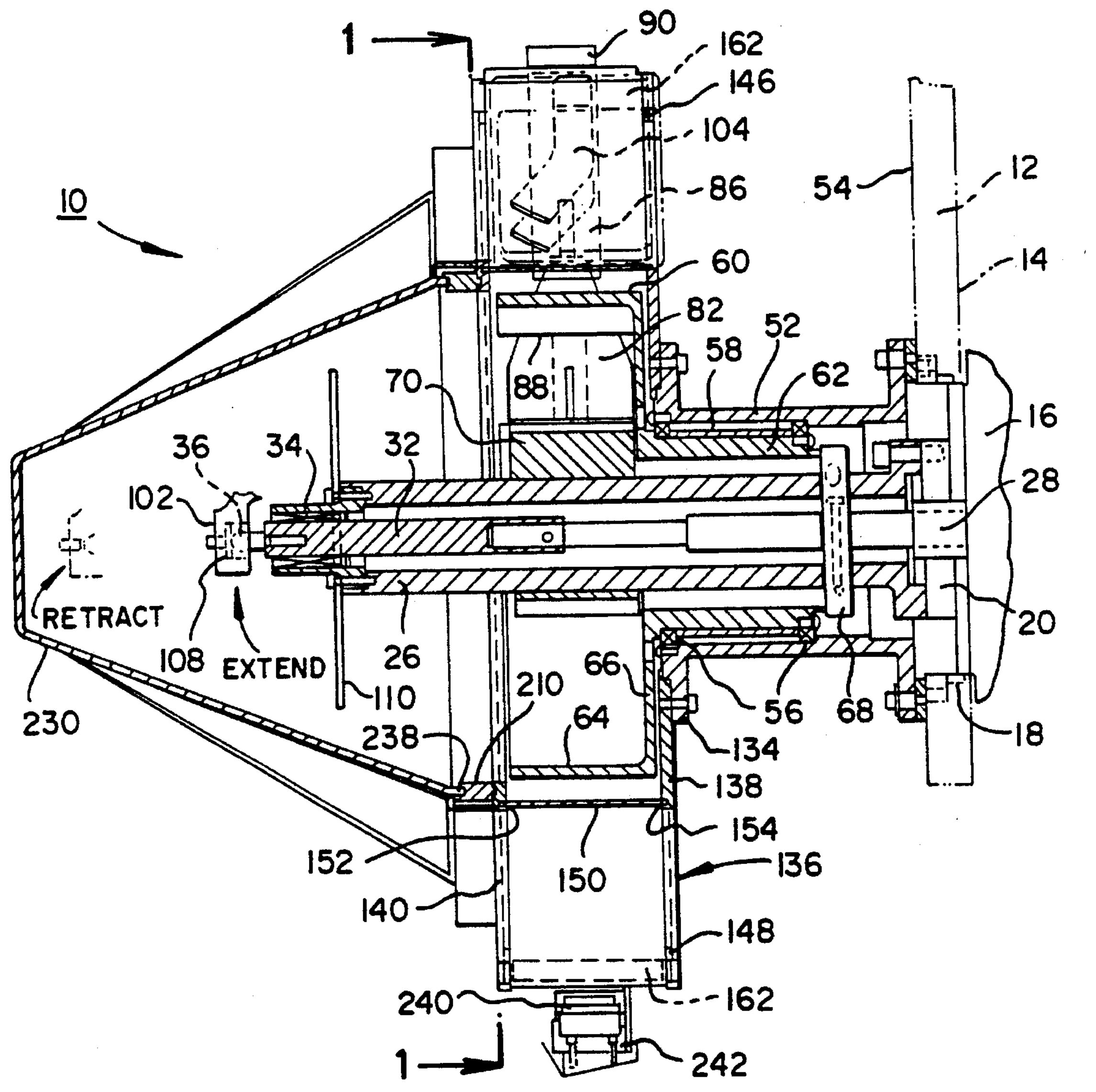
FIG. 2 shows a sectional view, partially broken away, taken along line 2—2 of FIG. 1.
Figure 3:
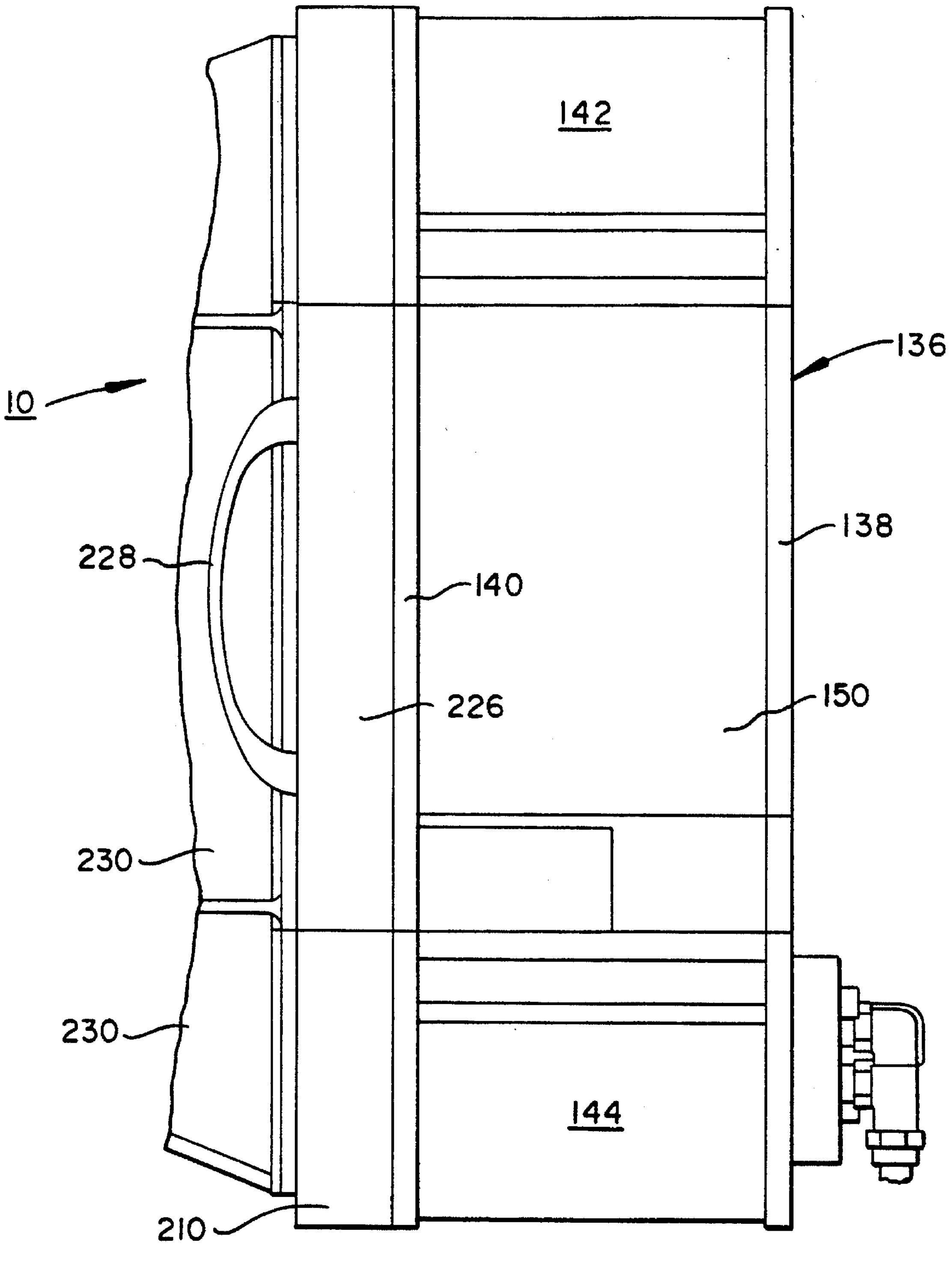
FIG. 3 shows a side elevation view taken along line 3—3 of FIG. 1.
Figure 4:
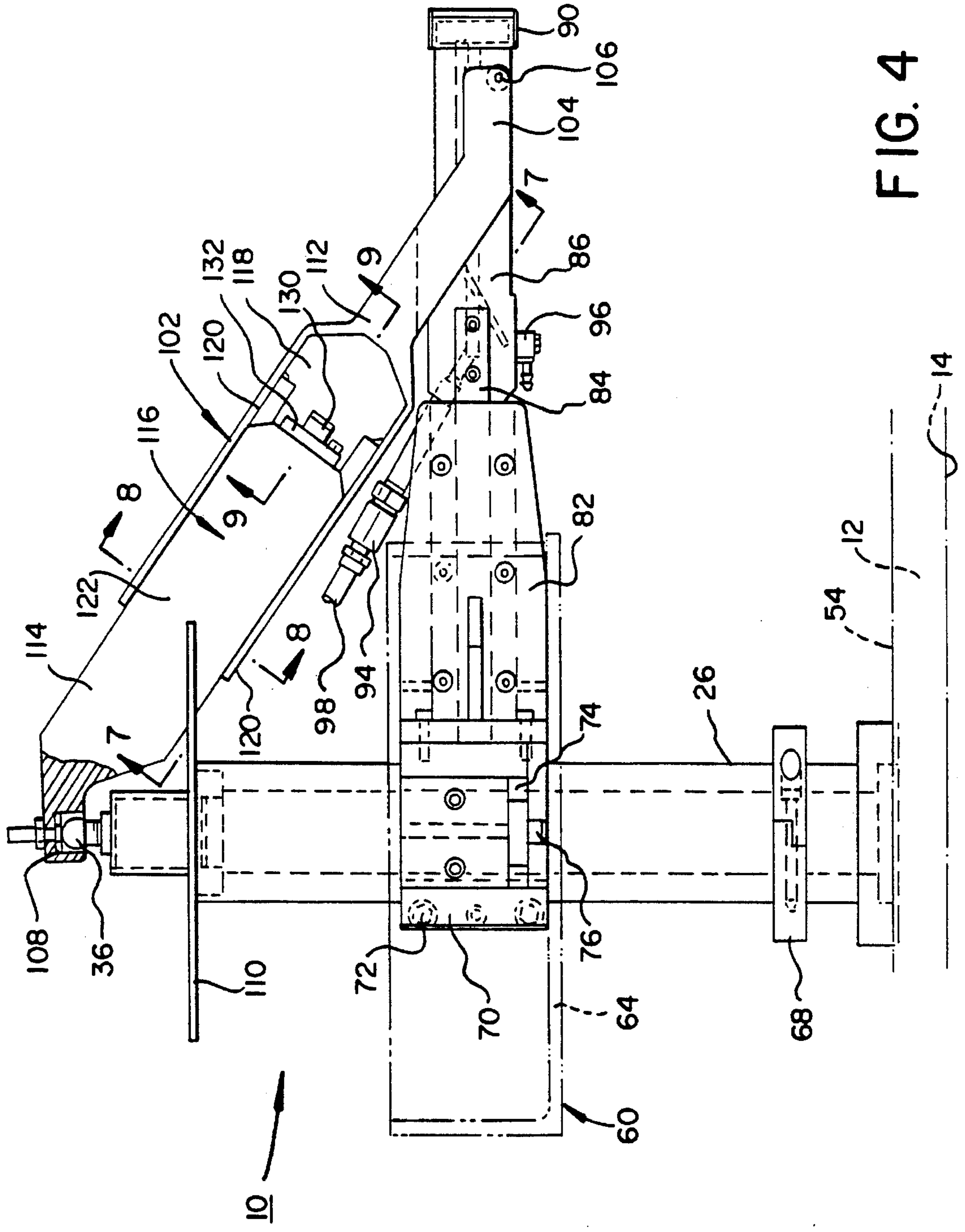
FIG. 4 shows a projected view, partially broken away, taken along line 4—4 of FIG. 1, with the collapsible connector arm shown in detail.
Figure 5:
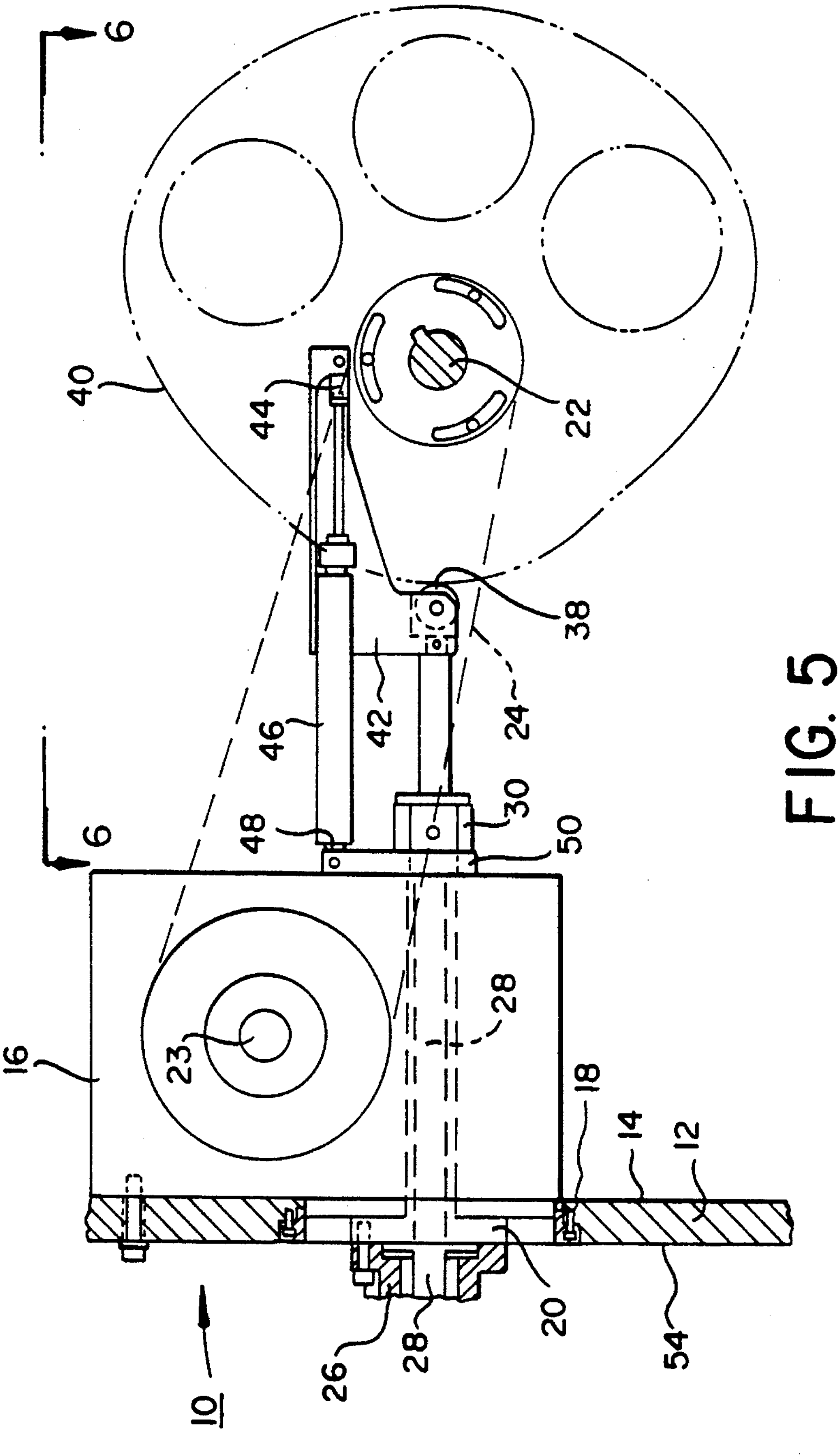
FIG. 5 shows a side elevation view of the actuators for the apparatus of FIGS. 1 to 4.
Figure 6:
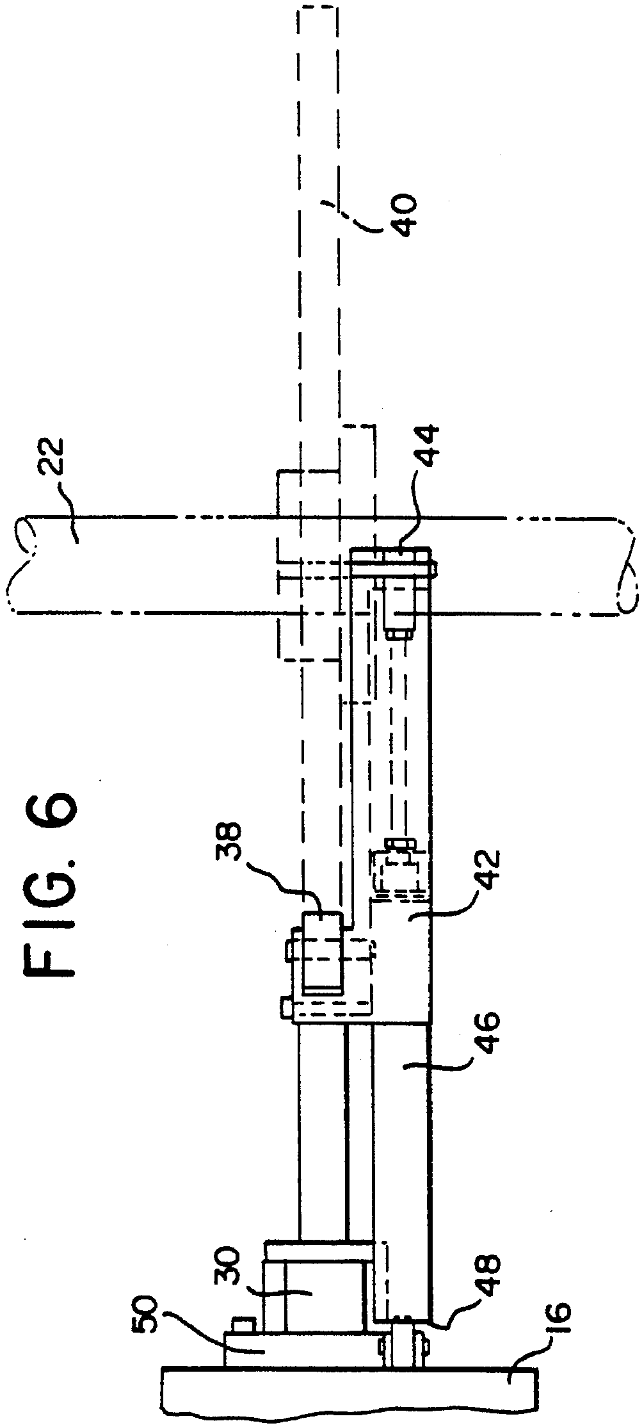
FIG. 6 shows a plan view of the actuators of FIG. 5, taken along line 6—6 of FIG. 5.
Figure 7:
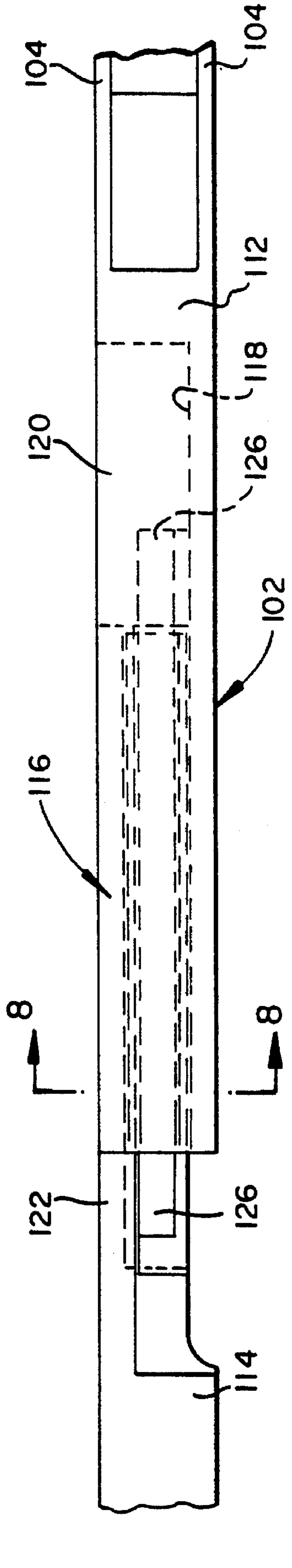
FIG. 7 shows a side view of the collapsible connector link, taken along line 7—7 of FIG. 4.
Figure 8:
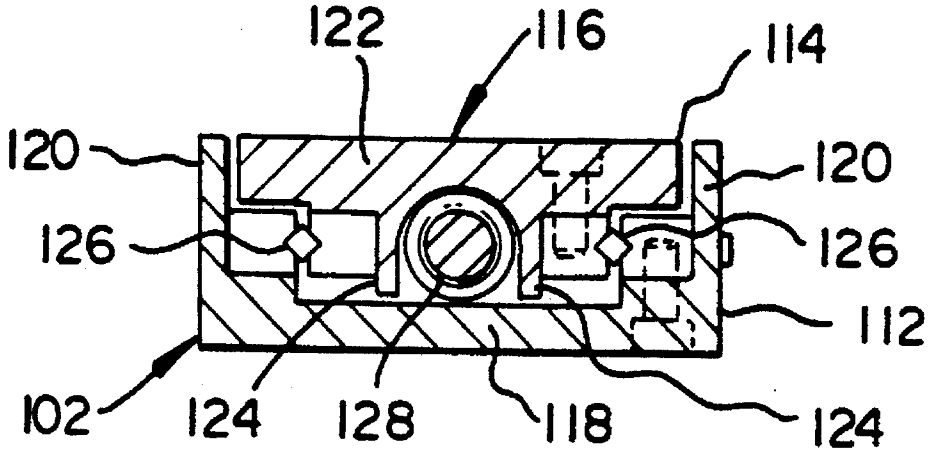
FIG. 8 shows a section view taken along lines 8—8 of FIGS. 4 and 7.
Figure 12:
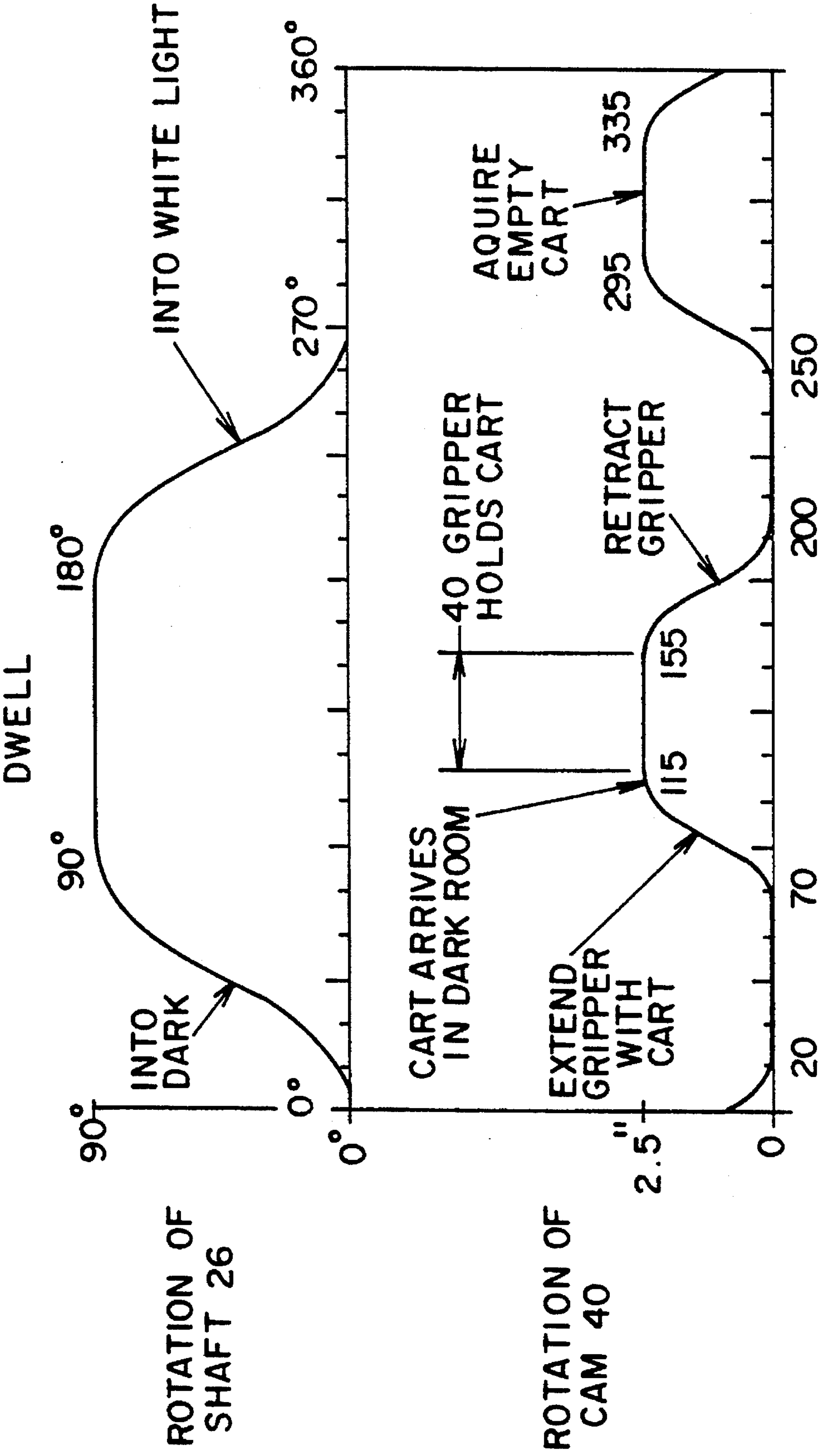
FIG. 12 shows a typical timing diagram for operation of the apparatus.

Referring simultaneously to FIGS. 1 to 9, various features of an apparatus 10 according to my invention may be understood. As seen in FIGS. 2, 5 and 6, a rigid machine frame or face plate 12 has a back side 14 to which is mounted a conventional oscillating drive 16 which produces an oscillating, approximately 90° rotary output in response to a continuous rotary input. A continuous, rather than oscillating, rotary output also could be used. A bore 18 through face plate 12 permits access to an output flange 20 of drive 16. Behind face plate 12 is mounted a line or drive shaft 22 which is operatively connected to drive 16 by a chain or toothed belt 24. Shaft 22 also synchronously drives an associated apparatus, not illustrated, for processing an empty film cartridge in a dark room, such as for installing a strip of photographic film. As will be explained with regard to FIG. 12, the speed of rotation of shaft 22 is twice that of input shaft 23 of drive 16. A support tube or shaft 26 is fixedly mounted for rotation with flange 20. A ball spline 28 extends through a bore in drive 16 concentric with shaft 26. As seen in FIG. 5, a bearing housing or ball spline nut 30 is mounted to the back side of the casing of drive 16. The front end of the shaft of ball spline 28 is pinned to a shaft coupling 32 which extends beyond the front end of shaft 26. A rotary bearing 34 is mounted to shaft 26 to support shaft coupling 32 and to permit the coupling to rotate and move axially within shaft 26. A spherical bearing member 36 is mounted to the front end of coupling 32.

On the opposite side of face plate 12, as seen in FIGS. 5 and 6, the back end of the shaft of ball spline 28 rotatably supports a cam follower 38. A plate cam 40, mounted for rotation with shaft 22, engages cam follower 38; so that, rotation of the cam will cause shaft coupling 32 to move axially within shaft 26. Means are provided to ensure firm engagement between cam follower 38 and cam 40 and also to permit disengagement of the two to inhibit movement of coupling 32. An L-shaped bracket 42 is fixedly attached on one leg to the back end of the shaft of ball spline 28. On the other leg of the bracket, a rod end 44 of a pneumatic actuator 46 is pivotably mounted. A cylinder end 48 of actuator 46 is pivotably supported on a spline nut support bracket 50 mounted on the back side of the casing of drive 16. Thus, when actuator 46 is extended by application of high pressure air from a conventional source, not illustrated, cam follower 38 is forced into engagement with cam 40. On the other hand, should it be desired to inhibit movement of coupling 32, actuator 46 may be retracted to prevent engagement between the cam follower and the cam.

Turning again to FIG. 2, a cylindrical bearing housing 52 is fixedly mounted to a front surface 54 of face plate 12, concentric with shaft 26. Within housing 52, a pair of axially spaced bearings 56 are mounted with a bearing spacer 58 between the bearings in the familiar fashion. A shutter belt drum 60 includes a hollow shaft 62 which is supported on the inner races of bearings 56. Drum 60 further includes a cylindrical circumferential wall 64 for engaging and guiding a shutter belt 168, to be described subsequently; and an annular back wall 66 extending between shaft 62 and wall 64. A split collar 68 is mounted on shaft 26 to prevent entry of light between shaft 26 and shaft 62 from the back side of face plate 12.

As best seen in FIGS. 1 and 4, a cartridge transfer assembly is supported by shaft 26. A pinch boss 70 is mounted on shaft 26 within drum 60 and secured by a pair of bolts 72. Mounted on one side of the pinch block is a drive bracket 74 which carries a rearwardly extended drive pin 76 which engages a bushing 78 supported on back wall 66. Thus, drum 60 will rotate with shaft 26. Mounted on another side of the pinch block are a pair of slide mount brackets 80, 82 which extend radially away from the axis of shaft 26. Between the mount brackets are positioned a pair of radially moveable slides 84. Mounted between slides 84 is a radially extended transfer arm 86. An opening 88 in circumferential wall 64 permits transfer arm 86 to move radially inward and outward on the slides, the radially outermost position being shown in FIGS. 1 and 4. At its outer end, transfer arm 86 supports a vacuum pickup head 90 having a rather semi-cylindrical cradle 92 for engaging and gripping an essentially cylindrical shell of a cartridge for photographic film, such as the cartridge disclosed in commonly assigned U.S. Pat. Nos. 5,319,407; 5,347,334; and 5,357,303. Of course, other essentially cylindrical cartridges or objects could be gripped using such a vacuum head. A vacuum connector 94 extends from one side of transfer arm 86 to connect a source of vacuum, not illustrated, to vacuum head 90 by means of internal passages, not illustrated, which extend through the transfer arm. A further pneumatic connector 96 may be provided to connect a passage from the vacuum head to a pressure sensor, not illustrated, for detecting the presence of a cartridge properly engaged with the vacuum head. Connecting conduit or tubing 98 from connector 94 extends rearward through an arcuate opening 100 in back wall 66 of drum 60 and exits the back of a light-lock enclosure 136, to be described subsequently, as shown in FIG. 3.

Figure 9:
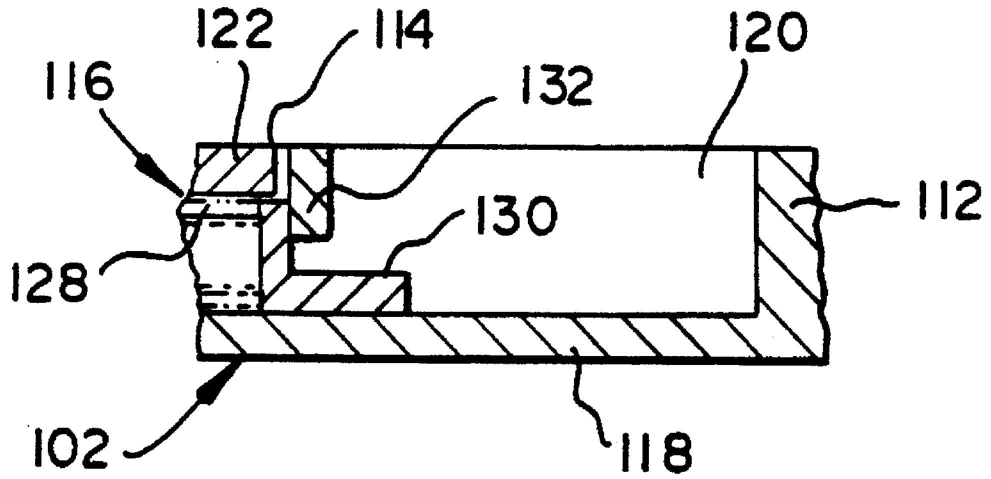
FIG. 9 shows a section view taken along line 9—9 of FIG. 4.

As shown fragmentarily in FIGS. 1 and 2 and in detail in FIG. 4, spherical bearing 36 and transfer arm 86 are pivotably connected to a collapsible connector arm 102. A clevis end 104 is connected to opposite sides of arm 86 at pivot 106, while a socket joint 108 is connected to bearing 36. As seen in FIGS. 2 and 4, a disk-shaped hose guard 110 is mounted to the end of shaft 26 to prevent entanglement of tubing 98 and connector arm 102 during oscillating rotation of shaft 26. The tubing is routed to the right of guard 110, as viewed in FIG. 2. Guard 110 includes a radial cut-out, not illustrated, for passage of connector arm 102. Arm 102 comprises a radially outer link 112 and a radially inner link 114 joined by a collapsible joint 116. As shown in FIGS. 4 and 7 to 9, within joint 116, link 112 includes a planar base wall 118 from which extend a pair of parallel side walls 120. Positioned between walls 120, link 114 includes a planar outer wall 122 from which depends a pair of elongated spring retention ribs 124. A pair of elongated roller guides 126 is connected between walls 120 and ribs 124. A compression spring 128 is captured between ribs 124. As seen in FIG. 9, spring 128 is held in place at one end by a spring mount 130 supported by base wall 118. The other end of the spring is held by a similar spring mount, not illustrated, supported on the underside of outer wall 122. To prevent spring 128 from forcing links 112, 114 apart, a spring stop 132 is mounted to the free end of outer wall 122, as seen in FIG. 9, in position to engage mount 130. At the free end of base wall 118, not illustrated, a similar spring stop is mounted to engage the other, similar spring mount. Thus, if excessive axial force is applied to collapsible arm 102, spring 128 will compress further to allow the arm to shorten and prevent damage. When the excessive force is relieved, the spring expands to its previous length to reestablish the desired length the arm.

As seen in FIG. 2, bearing housing 52 includes at its front end a peripheral flange 134 on which is mounted a light-lock enclosure 136. A back frame plate 138 is bolted directly to flange 134. A front frame plate 140, also shown in FIG. 16, is mounted in front of frame plate 138 by means of a pair of spacer blocks 142, 144 visible in FIGS. 1 and 3 and a pair of spacer posts 146, 148 visible in FIGS. 1 and 13. A thin gauge, peripheral, light-tight cover shell 150 is captured by a pair of peripheral grooves 152, 154 provided in frame plates 138, 140, respectively. To enable transfer arm 86 and vacuum head 90 to extend from within enclosure 136, shell 150 is provided with an opening 156 from a lighted area and an opening 158 into a dark room area 160.

Figure 13:
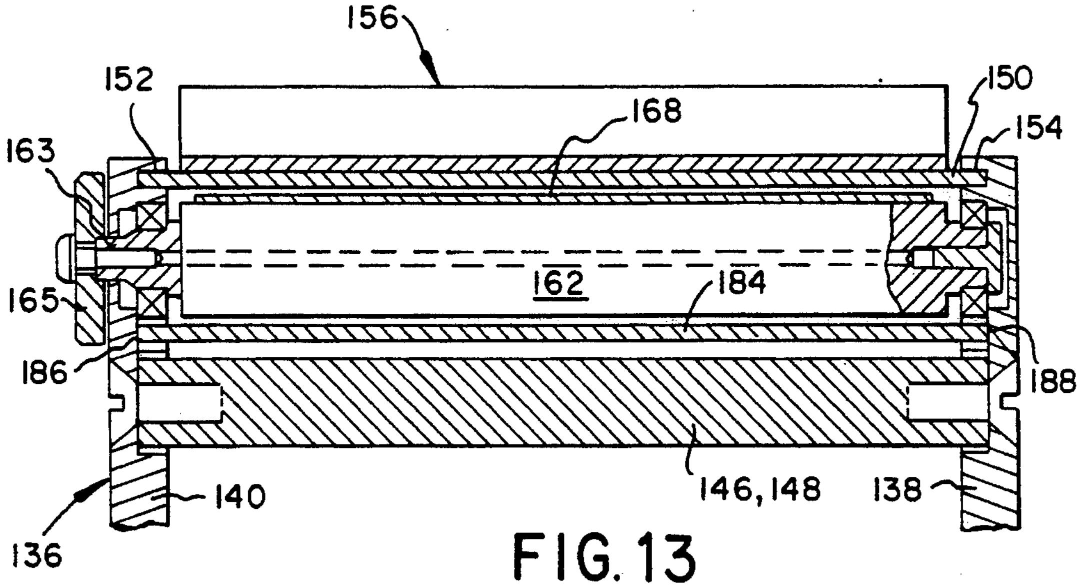
FIG. 13 shows a section view along line 13—13 of FIG. 1.

Flangeless rollers 162 are mounted between frame plates 138, 140 at essentially right angle corners of enclosure 136, as seen in FIG. 13. Flanged rollers 164 are mounted between the frame plates at locations along the periphery of enclosure 136 between rollers 162. Finally, flanged rollers 166 are mounted between the frame plates near shutter belt drum 60 at about the circumferential limits of travel of transfer arm 86, to guide the shutter belt from the drum. Since rollers 162, 164 are difficult to observe in the assembled apparatus, their shafts may be provided with end bosses 163 which extend through openings in front plate 140 and support end disks 165. Thus, an operator can observe disks 165 to confirm that rollers 162, 164 are rotating properly. A light impervious shutter belt 168 is threaded about drum 60, over the inner sides of rollers 166 and over the outer sides of rollers 162, 164. The ends of belt 168 are led through an opening 63 in circumferential wall 64 and are held within drum 60 by a clamping block 170 mounted on a radially moveable slide 172 supported by back wall 66. A set screw 174, threaded through an adjustment block 176 mounted on wall 66, bears on a take-up bracket 178 attached to slide 172. The ends of the belt are clamped into block 170 and then the radial position of the block is adjusted by rotating set screw 174 until an appropriate level of tension is achieved in the belt.

Figure 10:
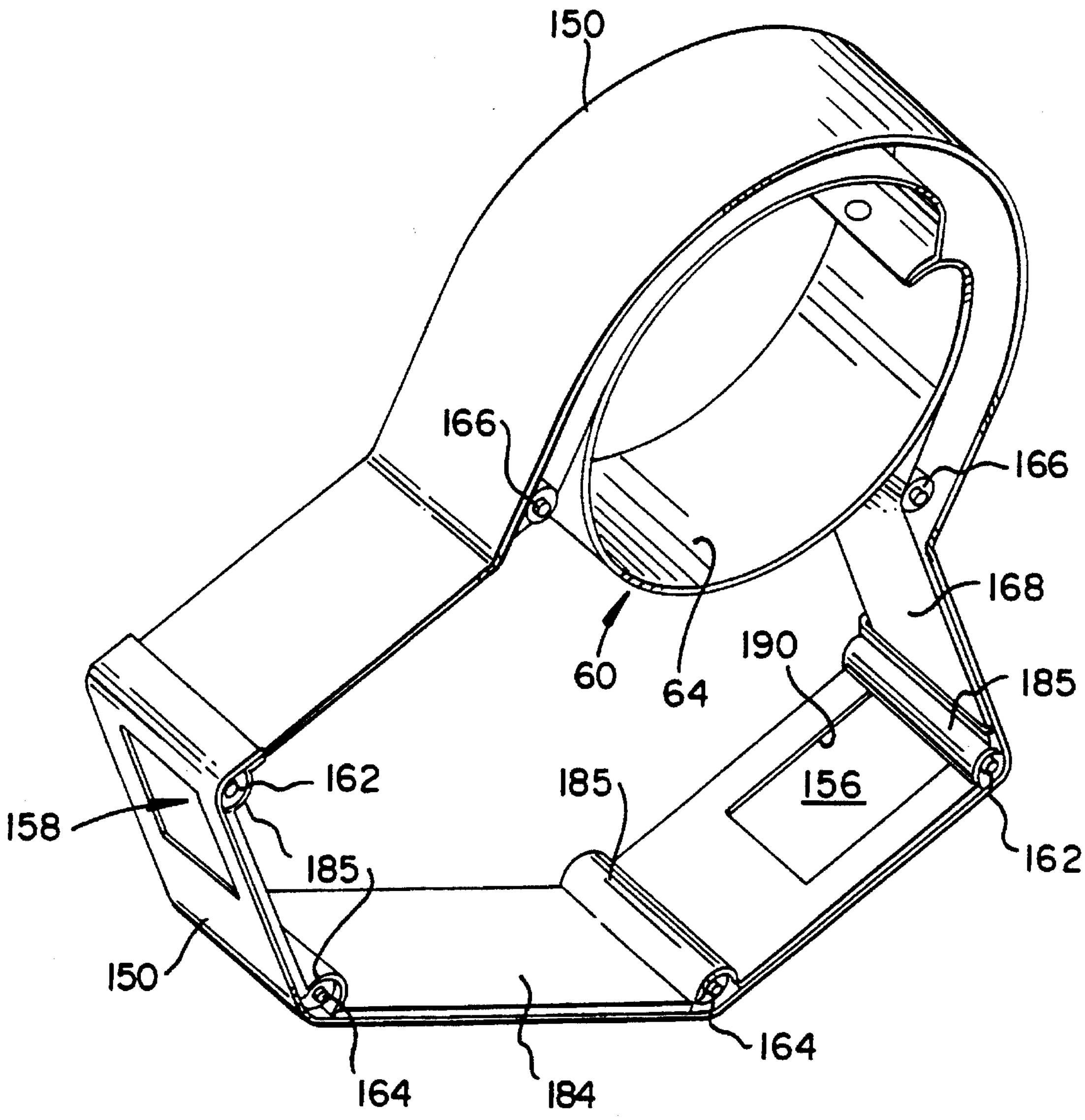
FIG. 10 shows a perspective view of certain components of the light lock enclosure, with the front and back frame plates and the domed cover removed.
Figure 11:
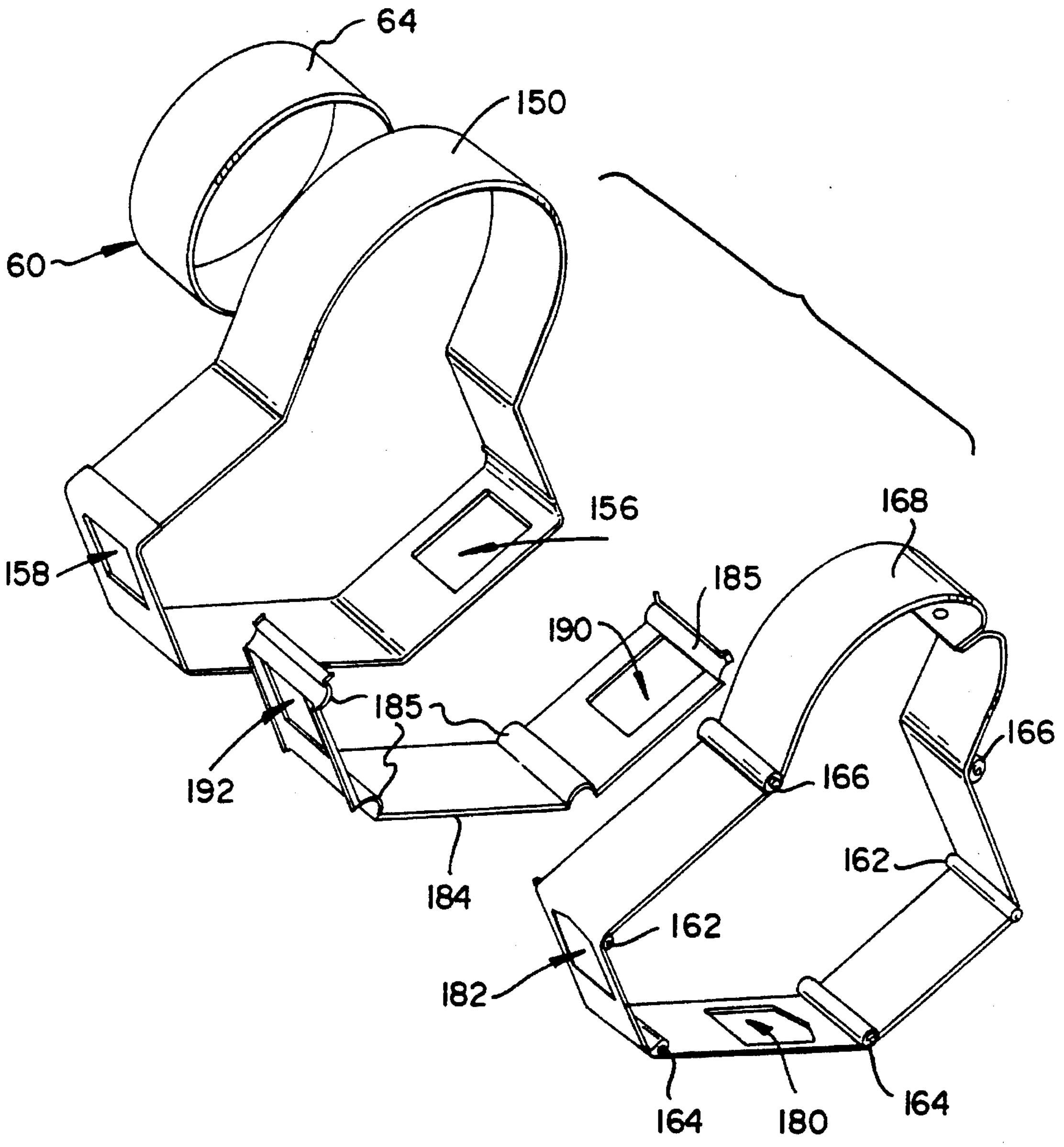
FIG. 11 shows an exploded view of the components of FIG. 10.
Figure 14:
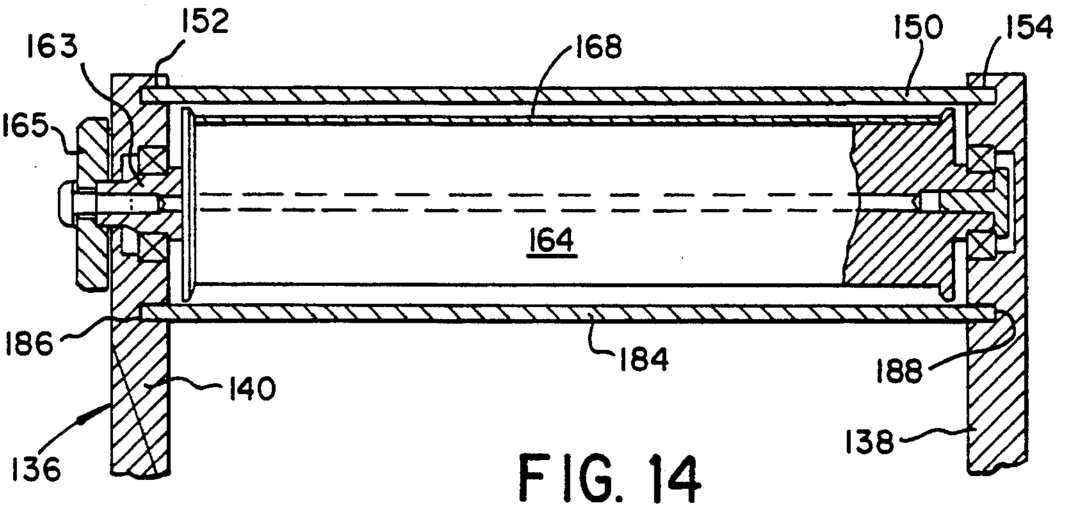
FIG. 14 shows a section view along line 14—14 of FIG. 1.
Figure 15:
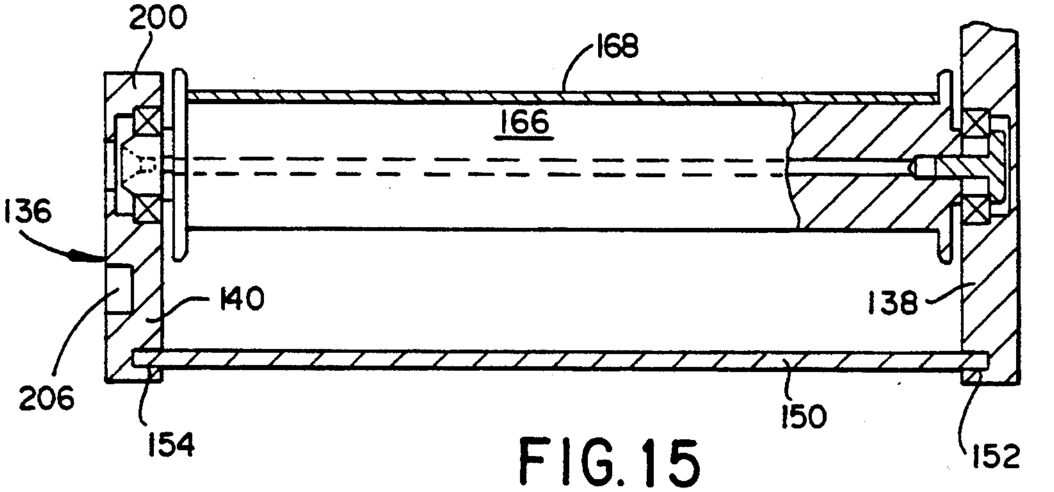
FIG. 15 shows a section view along line 15—15 of FIG. 1.

As shown in FIG. 11, belt 168 includes an aperture 180 for registration with opening 156 and an aperture 182 for registration with opening 158. Apertures 180, 182 are spaced along belt 168 so that when one aperture is in registration with its respective opening, the other aperture is positioned well to one side of its respective opening, thus ensuring that openings 156, 158 will never be open simultaneously into enclosure 136. To provide further assurance against leakage of light into enclosure 136 through openings 156, 158, a supplemental light-lock baffle 184 is provided between rollers 162; so that, belt 168 passes between peripheral shell 150 and baffle 184. As shown in FIGS. 10 and 11, the baffle includes partially cylindrical portions 185 which enclose rollers 162, 164. The baffle may be made from thin gauge metal and is captured by a pair of peripheral grooves 186, 188 provided in frame plates 138, 140, respectively. See FIGS. 13 and 14. Baffle 184 includes an aperture 190 for permanent registration with opening 156 and an aperture 192 for permanent registration with opening 158.

Light-lock enclosure 136 is closed by means of a domed closure shown in FIGS. 1, 3 and 16 to 18. As seen in FIGS. 1 and 16, front frame plate 140 includes a central opening 194 having an essentially semicircular peripheral portion 196 and an arcuate or fan-shaped peripheral portion 198. A pair of radially inwardly projecting flanges 200 are provided for mounting of rollers 166. On the underside of plate 140, as viewed in FIG. 16, mounting pockets 202 are provided for rollers 162 and mounting pockets 204 are provided for rollers 164. These pockets appear also in the broken away corners of FIG. 1. On the upper side of plate 140, a peripheral groove 206 surrounds opening 194 to receive a lower land on a cover frame to be described subsequently. A hinge block 208, shown in FIG. 1, is provided for the closure. Mounted on plate 140 is a cover frame 210, shown in FIG. 17, which includes a central opening 212 having an essentially semicircular peripheral portion 214 and an arcuate or fan-shaped peripheral portion 216. On the underside of frame 210, a peripheral land 218, shown in phantom lines in FIG. 17, is provided for mating with groove 206 on plate 140 to ensure light-tightness. On the upper side of frame 210, a peripheral groove 220 surrounds opening 212 to receive a lower land on a domed cover to be described subsequently. A pair of hinge bosses 222, 224 are provided for connection to hinge block 208 by suitable hinge pins 225 shown in FIG. 1. A radially extended lifting flange 226, opposite the hinge bosses, provides a convenient attachment place for a handle 228, as shown in FIGS. 1 and 3. Finally, a light-tight domed cover 230 is mounted to cover frame 210. The domed cover includes an essentially conical half portion 232; a faceted, fan-shaped half portion 234; and a top panel 236, all suitably joined to provide a light-tight shell. On the under edge of cover 230, a peripheral land 238 is provided for mating with groove 220 in frame 210. Preferably, a suitable opaque epoxy is used to seal land 238 within groove 220 to ensure light-tightness.

In operation of the apparatus of my invention, a cartridge 240 to be moved from a lighted environment is presented on a suitable conveyor 242 opposite opening 156, as shown fragmentarily in FIG. 2. From the position illustrated in FIG. 2, at which point both oscillating drive 16 and cam 40 are dwelling until a previous cartridge on vacuum head 90 has been removed by means not illustrated, the apparatus operates following the cycle illustrated schematically in FIG. 12. While oscillating drive 16 dwells and shaft 26 is stationary, cam 40 causes shaft coupling 32 to extend to the position shown fragmentarily in FIG. 3, thus causing connector arm 102 to pull transfer arm 86 and vacuum head 90 radially inwardly through opening 158 into light-lock enclosure 136. Oscillating drive 16 then rotates shaft 26 about 90° counterclockwise, as seen in FIG. 1, until vacuum head 90 is opposite opening 156, at which point the drive again dwells. Rotation of shaft 26 also rotates shutter drum 60 which pulls along shutter belt 168 to first cover opening 158 and then expose opening 156, as the positions of apertures 180, 182 change during rotation. Cam 40 then causes shaft coupling 32 to retract to the position shown in full in FIG. 3, thus causing connector arm 102 to push transfer arm 86 and vacuum head radially outwardly through opening 156. Drive 16 and cam 40 then dwell until cartridge 240 has been gripped by vacuum head 90 for removal from conveyor 242. The process then repeats, in reverse.

PARTS LIST

10 . . . apparatus according to invention
12 . . . rigid face plate or machine frame
14 . . . back side of 12
16 . . . conventional oscillating drive
18 . . . bore through 12
20 . . . output flange of 16
22 . . . line drive shaft
23 . . . input shaft of 16
24 . . . chain or toothed belt
26 . . . support tube or shaft
28 . . . ball spline
30 . . . bearing housing or ball spline nut?
32 . . . shaft coupling attached to 28
34 . . . rotary bearing
36 . . . spherical bearing on front end of 32
38 . . . cam follower
40 . . . cam on 22
42 . . . L-shaped bracket on back end of 28
44 . . . rod end
46 . . . pneumatic actuator
48 . . . cylinder end
50 . . . spline nut support bracket
52 . . . bearing housing concentric with 26
54 . . . front side of 12
56 . . . bearings
58 . . . bearing spacer
60 . . . shutter belt drum
62 . . . hollow shaft
63 . . . opening in 64
64 . . . circumferential wall
66 . . . annular back wall
68 . . . split collar on 26
70 . . . pinch boss
72 . . . bolt
74 . . . drive bracket mounted on 70
76 . . . pin
78 . . . bushing supported by 66
80, 82 . . . slide mounts
84 . . . slides
86 . . . transfer arm

88 . . . opening in 64 for 80–86
90 . . . vacuum pickup head
92 . . . cradle in 90
94 . . . vacuum connector
96 . . . pneumatic connector
98 . . . tubing from 94
100 . . . arcuate opening in 66 for 98?
102 . . . collapsible connector arm or link
104 . . . clevis end
106 . . . pivot to 86
108 . . . socket joint for 36
110 . . . disk shaped hose guard
112 . . . radially outer link half
114 . . . radially inner link half
116 . . . collapsible joint between 112 and 114
118 . . . base wall in 112
120 . . . side walls perpendicular to 118
122 . . . outer wall
124 . . . spaced spring retention ribs on 122
126 . . . roller guides between 120 and 124
128 . . . compression spring
130 . . . spring mount
132 . . . spring stop
134 . . . peripheral flange on 52
136 . . . light-lock enclosure
138 . . . back frame plate
140 . . . front frame plate
142, 144 . . . spacer blocks
146, 148 . . . spacer posts
150 . . . peripheral light-tight cover shell
152, 154 . . . peripheral grooves in 138, 140
156 . . . opening through 150 into 136 from lighted area
158 . . . opening through 150 into 136 from darkened area
160 . . . dark room area
162 . . . flangeless idler roller
163 . . . end boss
164 . . . flanged idler roller
165 . . . end disk
166 . . . flanged idler roller
168 . . . shutter belt
170 . . . clamping block
172 . . . slide
174 . . . set screw
176 . . . adjustment block
178 . . . take-up bracket on 172
180 . . . aperture in belt for 156
182 . . . aperture in belt for 158
184 . . . supplemental light-lock baffle
185 . . . partially cylindrical portions of 184
186, 188 . . . peripheral grooves in 138, 140 for 184
190 . . . aperture for 156
192 . . . aperture for 158
194 . . . central opening in 140
196 . . . semicircular portion of 194
198 . . . arcuate or fan-shaped portion of 194
200 . . . flanges for 166
202 . . . mounting pockets for 162
204 . . . mounting pockets for 164
206 . . . peripheral groove around 194
208 . . . hinge block
210 . . . cover frame
212 . . . central opening in 210
214 . . . semicircular portion of 212
216 . . . arcuate or fan-shaped portion of 212
218 . . . peripheral land to fit into 206
220 . . . peripheral groove
222, 224 . . . hinge bosses 225 . . . hinge pin
226 . . . radially extended flange on 210
228 . . . handle
230 . . . light-tight dome cover
232 . . . conical portion of 230
234 . . . faceted, fan-shaped portion of 230
236 . . . top panel
238 . . . peripheral land to fit into 220
240 . . . cartridge
242 . . . conveyor While my invention has been shown and described with reference to particular embodiments thereof, those skilled in the art will understand that other variations in form and detail may be made without departing from the scope and spirit of my invention.

Having thus described my invention in sufficient detail to enable those skilled in the art to make and use it, I claim as new and desire to secure Letters Patent for:

1. Apparatus for moving objects from one location to another, comprising:

a frame;

a hollow shaft rotatably supported by the frame;

an object transfer assembly supported on the hollow shaft for movement between a first position for access to one location and a second position for access to another location;

a first actuator for rotating the hollow shaft between the first and second positions;

an extendible transfer arm included in the transfer assembly;

a pickup head, supported by the extendible transfer arm, for grasping an object or releasing an object; and a second actuator for moving the pickup head back and forth with the extendible transfer arm at each of the first and second positions, the second actuator comprising an actuator rod extended through the hollow shaft, the actuator rod having a driven end and an output end; a cam supported by the frame and operatively connected for synchronous rotation by the first actuator, the cam being engaged with the driven end of the actuator rod; a connector arm pivotably connected at one end to the output end of the actuator rod and pivotably connected at another end to the transfer arm, whereby rotation of the cam causes translational movement of the actuator rod which causes the connector arm to move the transfer arm radially relative to the hollow shaft.

2. Apparatus according to claim 1, wherein the extendible transfer arm is supported by a slide; and the second actuator moves the transfer arm radially outward and inward at the first and second positions.

3. Apparatus according to claim 2, wherein the transfer assembly oscillates between the first and second positions.

4. Apparatus according to claim 1, further comprising means for selectively disengaging the cam from the driven end of the actuator rod, to inhibit radial movement of the transfer arm.

5. Apparatus according to claim 1, wherein the means for selectively disengaging comprises a cam follower supported by the driven end; a cam follower bracket attached to the driven end; and a pneumatic actuator connected between the frame and the follower bracket for selectively disengaging the cam follower from the cam.

6. Apparatus according to claim 1, wherein the connector arm is collapsible in case of overload applied to the pickup head.

7. Apparatus according to claim 1, wherein the cam causes the transfer arm to dwell at the first and second positions.

* * * * *